United States Patent [19]

Bush et al.

[11] Patent Number: 4,519,591
[45] Date of Patent: May 28, 1985

[54] NON-METALLIC LEAF SPRING STRUCTURE

[76] Inventors: John W. Bush, 50740 Jefferson, New Baltimore, Mich. 48047; Peter C. Bertelson, 30325 Ponds View Dr., Franklin, Mich. 48025

[21] Appl. No.: 410,171

[22] Filed: Aug. 20, 1982

[51] Int. Cl.³ ............................................. F16F 1/18
[52] U.S. Cl. .................................... 267/148; 267/47; 267/149; 267/158
[58] Field of Search ................. 267/148, 149, 47, 158, 267/44

[56] References Cited

U.S. PATENT DOCUMENTS 1,380,523   6/1921   Brock ................................ 267/47
3,900,357   8/1975   Huchette et al. ................. 267/47
3,975,005   8/1976   Duchemin ........................ 267/47

FOREIGN PATENT DOCUMENTS 0416232   7/1925   Fed. Rep. of Germany ........ 267/47
107138     8/1980   Japan .................................. 267/148
2091379   7/1982   United Kingdom .

Primary Examiner—Bruce H. Stoner, Jr.
Assistant Examiner—Michael P. Gilday

[57] ABSTRACT

A leaf spring is provided in which the major component is a leaf made up of continuous strands of fibers distributed in a matrix of polymerized plastic resin. The spring has a theoretical constant cross-sectional area and uniform width throughout its length and at the same time is thickest at its midportion and tapers to the opposite ends. The spring results in an arrangement having a cavity intermediate opposite ends and opposite sides which is capable of receiving locating pins or bolts of the type used with conventional metal leaf springs without the requirement for drilling of holes or otherwise weakening the structure. One embodiment of the invention incorporates a metallic leaf with the non-metallic components.

11 Claims, 13 Drawing Figures

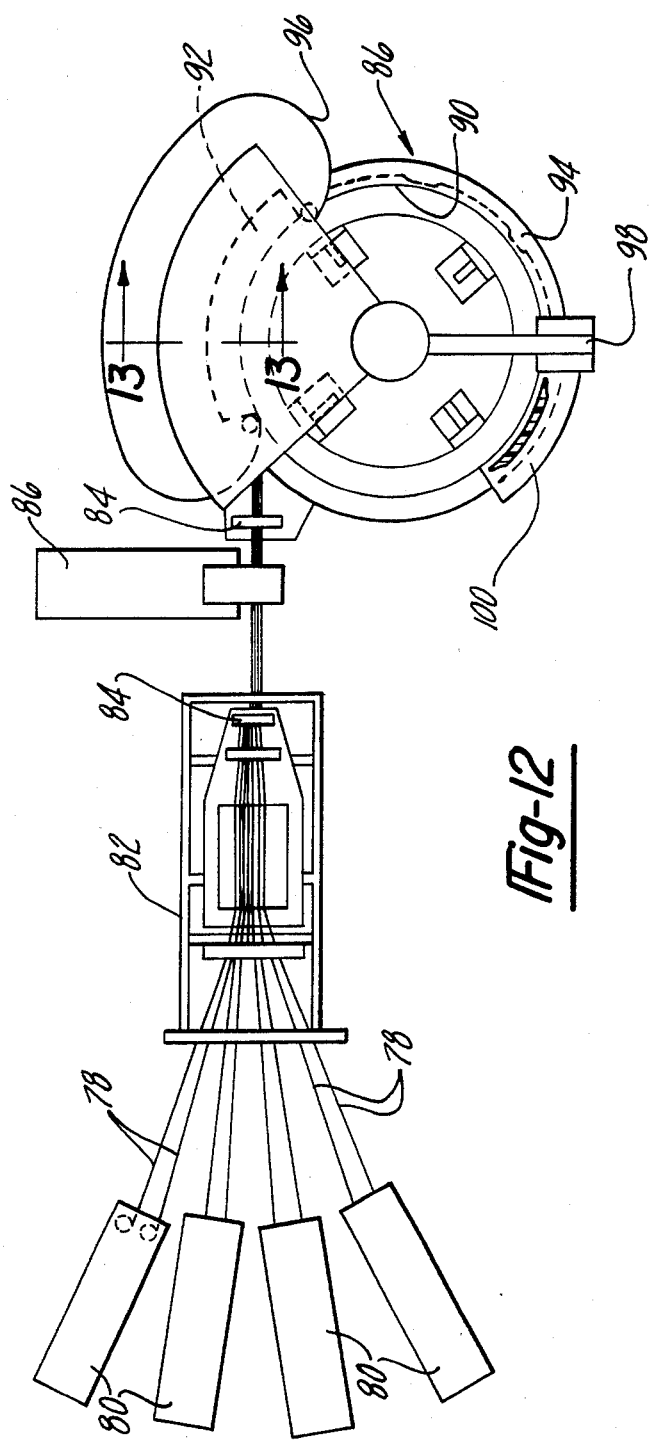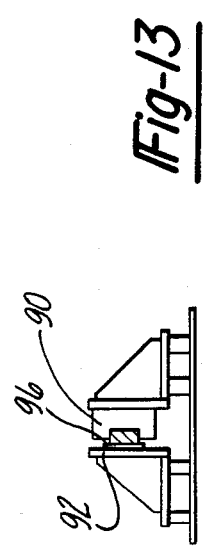

NON-METALLIC LEAF SPRING STRUCTURE

This invention relates to leaf springs and in particular to leaf springs having non-metallic components.

Metal leaf springs are well known and have been used extensively particularly in the automotive field to suspend vehicle bodies relative to the ground engaging wheels. Such metal springs are heavy, adding substantially to the weight of the vehicle and therefore to the energy required to propel the vehicle. In addition, because of the characteristics of metal and the traditional manufacturing techniques, metal leaf springs usually are made up of a large number of leafs which must be held in the assembled condition. The abutting leafs are subject to noise and inter-leaf friction during flexing of the spring assembly and are subject to the accumulation of dirt and moisture leading to corrosion. Also metal leaf springs serve to transmit sounds between the suspended and unsuspended vehicle portions. In contrast to this, non-metallic springs can be made in a single unit and of various shapes to attain all of the beneficial operating characteristics without many of the deficiencies of metal springs such as noise, corrosion and weight.

Non-metallic springs made of reinforced plastic such as glass filaments in a matrix of epoxy or other resin, can be made in a variety of shapes not attainable with metal components and one such shape is a spring having a theoretical uniform cross section throughout its length but with a varying thickness. This results in the spring having its maximum height and minimum width at the center with the spring tapering in opposite directions toward its ends at which the width is a maximum and the height is a minimum. Such a shape, often referred to as a "bow-tie", offers many of the advantages attainable with non-metallic springs over metal springs but suffers from the disadvantage that this shape prevents conventional mounting because of space limitations and vehicle design. As a consequence, the use of such non-metallic springs meets resistance from the vehicle manufacturer and user.

The manufacture of such non-metallic springs presents special problems, particularly because the shapes no longer are in the traditional configurations. For example, in a non-metallic spring of varying thickness and constant cross section, special problems can be presented in curing of the resin matrix in which the filaments are embedded because of the limited surface area which can be exposed to heat for curing. This, of course, increases the time and labor required to manufacture such springs.

Another problem in using non-metallic springs is that the available mounting hardware on vehicles is designed to receive metallic springs. One particular problem is such that the mounting hardware relies on a center mounting bolt or stud which passes through all the leafs of the metallic spring. However, in non-metallic springs, the conventional formation of a hole to receive such a bolt severs load bearing fibers and causes a stress concentration which can seriously weaken the springs.

It is an object of the invention to provide a non-metallic leaf spring having a theoretical uniform area cross section throughout its length but varying in thickness from a maximum at its midpoint toward its opposite ends.

Another object of the invention is to provide such a constant area spring tapering from its midpoint toward its opposite ends which at the same time have a uniform width for mounting in much the same manner as conventional metallic spring.

Yet another object of the invention is to provide a non-metallic leaf spring which can be used with the same mounting hardware used to secure metallic leaf springs to the suspended or unsuspended portions of vehicle structures.

More particularly it is an object of the invention to provide a non-metallic leaf spring which can be used with the conventional center bolt of vehicle leaf spring without compromising maximum spring strength, life or durability.

Yet another object of the invention is to provide a non-metallic variable thickness spring which affords additional surfaces which can be subjected to heat to reduce the curing time of plastic material making up the springs.

A further object of the invention is to provide a non-metallic spring which can be manufactured in a continuous process thereby minimizing manual labor and time.

The objects of the invention are accomplished by leaf spring structures or assemblies in which the main body members are formed of continuous filaments in a matrix of polymerized plastic resin and the spring body has a theoretical shape of uniform width and cross-sectional area but with a varying thickness such that the thickest portion of the spring is at its midportion and the thinnest portions are adjacent its opposite ends. This results in a body structure having a recess intermediate its opposite ends and sides which affords additional exposed surface areas that can be subject to heat to accelerate curing of the plastic resin during manufacturing and which affords a space to receive portions of conventional mounting elements of the type used to hold multiple metal leaf springs assembled. In one embodiment of the invention, a pair of spring portions are formed in an integral unit to form a cavity and in other embodiments, the spring portions are separate and assembled in layers of two or more portions. In another arrangement, a non-metallic leaf spring can be used in combination with the primary leaf of a metal spring.

The preferred embodiments of the invention are illustrated in the drawings in which:

FIG. 12 is a diagrammatic view of apparatus for manufacturing the various embodiments of the invention; and FIG. 13 is a view of the mold apparatus taken on line 13—13 in FIG. 12.

Figure 1:
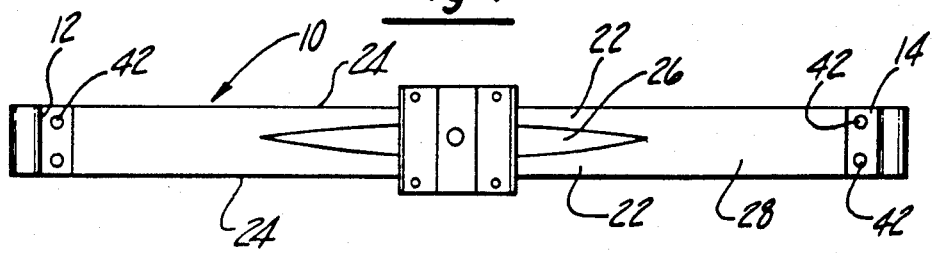
FIG. 1 is a plan view of a leaf spring assembly embodying the invention.
Figure 2:
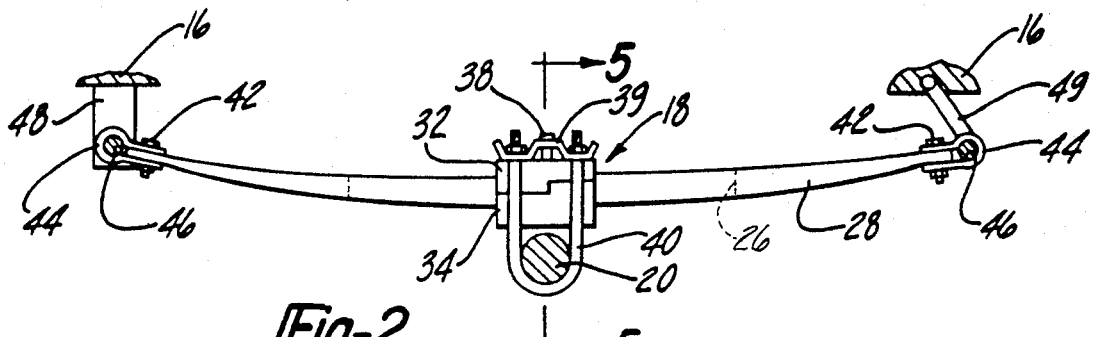
FIG. 2 is a side elevation of the spring assembly seen in FIG. 1.

A leaf spring embodying the invention is designated generally at 10 in FIGS. 1 and 2 and is provided with metal end fittings 12 and 14 connecting the spring 10 to a sprung structure 16 and a center mounting assembly 18 by which the spring 10 can be connected to an unsprung member, such as an axle 20 of a motor vehicle. The leaf spring 10 is made up of a plurality of continuous strands of fiber such as glass, which are arranged in substantially parallel relationship to each other in a matrix of polymerized resin, such as epoxy, for example.

Figure 6:
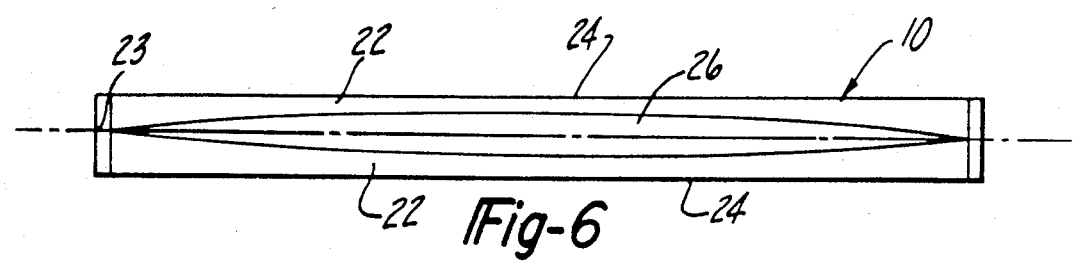
FIG. 6 is a top view illustrating the theoretically preferred configuration of the embodiment seen in FIG. 1.
Figure 7:
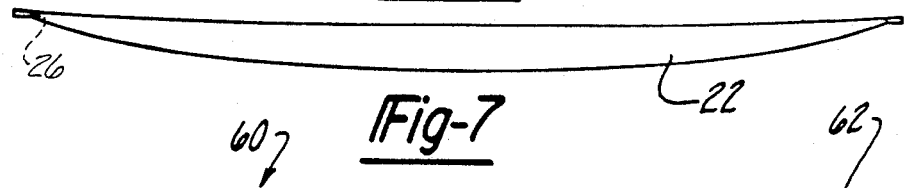
FIG. 7 is a side elevation of the structure in FIG. 6.

The spring 10 has a theoretical shape illustrated in FIGS. 6 and 7 and can be considered as including a pair of body portions 22 symmetrically disposed to opposite sides of an imaginary line indicated at 23. The body portions are substantially identical except they are mirror images of each other. Each of the body portions 22 has a shape varying in thickness and width in opposite directions from a midpoint substantially midway of its length. Each body portion 22 has its greatest thickness and its smallest width at a midportion with the thickness diminishing and the width increasing toward opposite ends of the body portions 22. Additionally, each of the body portions has a straight side edge 24 with a pair of side edges 24 of a pair of body portions of the leaf spring 10 being disposed parallel to each other as seen in FIGS. 1 and 6. This results in a leaf spring 10 having a uniform width throughout its entire length but one in which the thickness is greatest intermediate the opposite ends of the spring. In theory, the spring 10 has a uniform cross-sectional area throughout its length with a uniform width and tapering in thickness from a midpoint to its opposite ends. In actual practice, the leaf spring 10 has its opposite ends made thicker than the theoretical dimension in order to accept the mounting of fittings such as the end fittings 12 and 14 seen in FIG. 1, which require fasteners. The additional thickness is necessary to minimize stress concentrations. Even with the increased thickness at the opposite ends, the end portions are substantially thinner than the midportion of the body portions 22.

As seen in both FIGS. 1 and 6, the spring 10 results in an arrangement in which an elongated recess 26 is provided substantially midway between opposite ends and midway of the opposite side edges 24 of the spring 10. The portion of the spring represented by the recess 26 forms no part of the structural strength or operation of the spring and since it is not required, can be left vacant to reduce the weight of the overall spring assembly. It will be understood, however, that the recesses 26 could be filled with a lightweight filler.

Figure 5:
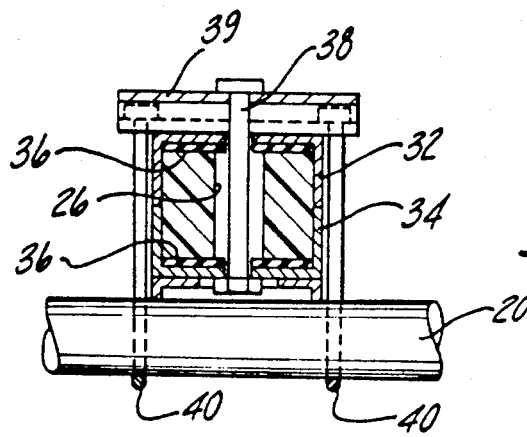
FIG. 5 is a cross-sectional view taken on line 5—5 in FIG. 2.

Referring now to FIGS. 1, 2 and 5, an embodiment of the invention is shown in which a pair of body portions 22 are formed integrally with each other to form a single body member 28 having a uniform width but tapering in thickness from a midpoint towards it opposite ends. The theoretical uniform cross sectional area is approached by the formation of the recess 26 The spring 10 can be connected to an axle 20 of a vehicle in the same manner as conventional metal leaf springs by the use of a conventional mounting assembly 18 disposed at an intermediate portion of the body member 28. Such a mounting assembly 18 includes a pair of identical channel elements 32 and 34 disposed at opposed top and bottom portions of the body member 28 with the open portions of the channels facing each other. A pair of rubber pads 36 are disposed between the body member 28 and the channel elements 32 and 34 and preferably are bonded to both the channels 32, 34 and to the body member 28. A locating bolt or stud 38 can be arranged to pass through both of the channel elements 32 and 34 and through a bracket member 39 at the upper side of the assembly 18. The bolt 38 passes freely through the recess 26 formed between the body portions 22. In conventional leaf spring assemblies, the bolt 38 is required to maintain the multiple layers of leafs in position relative to each other. In the present arrangement, the leaf spring 10 can be used with metal leaf spring mounting structures such as mounting assemblies 18 without requiring the drilling of an opening at the midpoint of the spring.

The axle 20 is secured to the spring 10 and to the remainder of the mounting assembly 18 by means of a pair of U-bolts 40, the ends of which pass through the bracket member 39 above the spring body 28. In the assembled condition of the spring 10 and the mounting assembly 18, the U-bolts 40 act to hold the channel elements 32 and 34 relative to each other as well as to compress the rubber pads 36.

The end fittings 12 and 14, seen in FIGS. 1 and 2, by which the leaf spring 10 can be supported relative to the sprung structure 16 each are generally U-shaped with the leg portions disposed at opposite top and bottom surfaces of the body member 28. The end fittings 12 and 14 are held in position by means of bolts 42 so that eye portions 44 can receive transverse mounting bolts 46. The left end of the spring body 28 as viewed in FIG. 2, may be pivotally supported by way of a mounting bolt 46 passing through a fixed bracket 48 and the right end of the spring body 28 can be pivotally connected by the bolt 44 to a link structure 49 which accommodates changes in the spacing between the mounting bolts 46 at opposite ends of the spring upon deflection of the spring body. To accommodate the bolts 42 holding the end fittings 12 and 14 in position, the body member 28 has a thickness larger than the theoretical thickness required to maintain a uniform cross section. The extra thickness is provided to accommodate any increased stress concentrations caused by holes for the mounting bolts 42. This thickness, however, still is less than the thickness at the intermediate area adjacent the axle mounting 18.

Figure 3:
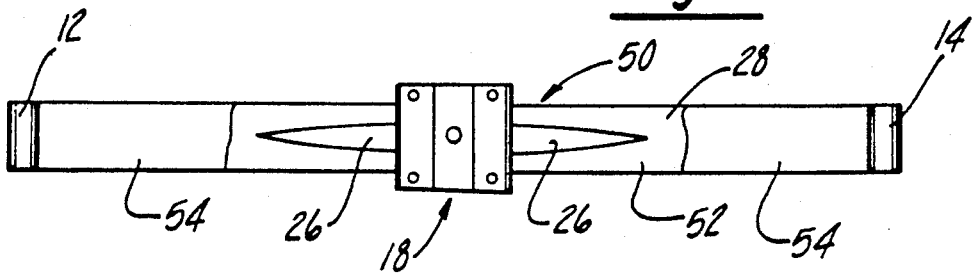
FIG. 3 is a plan view similar to FIG. 1 showing another embodiment of the invention.
Figure 4:
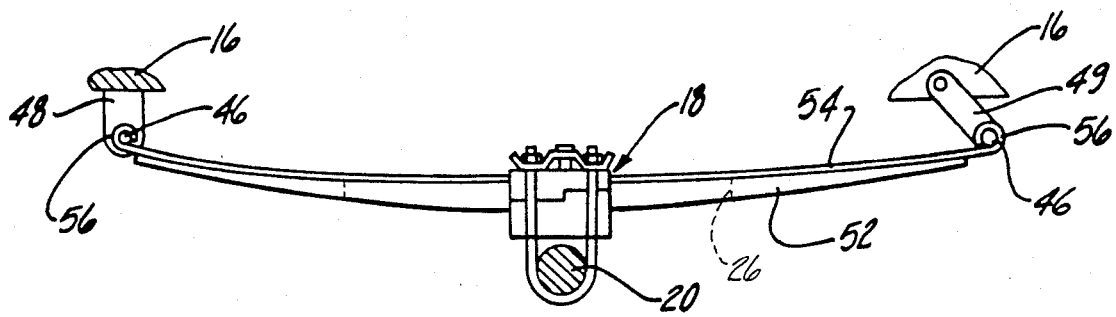
FIG. 4 is a side elevation of the arrangement seen in FIG. 3.

Referring to FIGS. 3 and 4, another embodiment of the invention is shown in which a spring assembly 50 includes a filament reinforced plastic body member 52, which can be identical with the body member 28 of the prior embodiment. In this instance, the body member 52 is assembled with a metal leaf 54 which can be a conventional master leaf, such as that used in metal leaf spring assemblies. Such master leafs typically are formed with eyes 56 at their opposite ends to accommodate mounting bolts. In this embodiment, transverse mounting bolts 46 support the spring assembly 50 relative to the sprung body 16 in the same manner as the spring assembly 10. The body member 52 is held in assembled relationship to the metal leaf 54 by way of the mounting assembly 18 which can be identical with that used with the leaf spring 10. The locating bolt 38 will pass through a hole in the metal leaf 54 and through the elongated recess or cavity 26.

In both the spring assembly 10 and the spring assembly 50, the respective body members 28 and 52 can be substantially identical except that in the spring assembly 10, holes must be provided for the bolts 42 holding the end fittings 12 and 14 in position. Since the body member 52 is without holes at the ends, these portions can be thinner than in the body member 28 to more accurately reflect the theoretical uniform cross-sectional area throughout the entire length of the body member 52.

Figure 8:
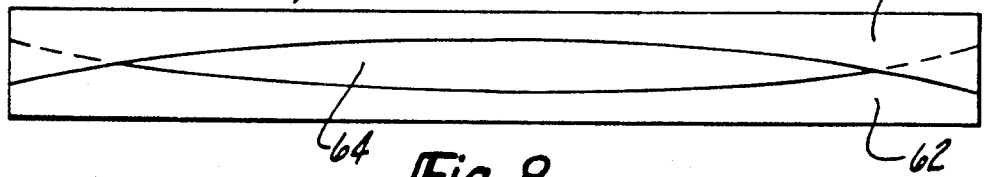
FIGS. 8 and 9 are top and side elevation views, respectively, of the theoretically correct configuration of another embodiment of the invention.
Figure 9:
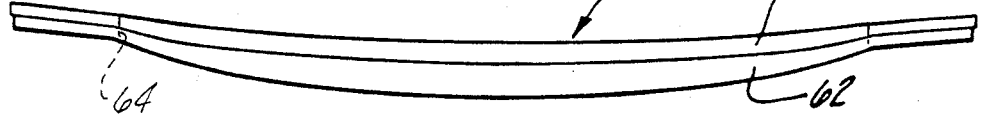

Referring now to FIGS. 8 and 9, still another embodiment of the invention is illustrated diagrammatically in which the spring assembly 60 is made up of a pair of body portions 62 which have the same general configuration as the body portions 22 but are formed separately. In their assembled condition seen in FIG. 9, the body portions are disposed in layers with one body portion 62 above the other to form the spring assembly 60 Only two body portions 62 are illustrated but it will be understood that an even or odd number of such body members 62 can be disposed in layers and the assembled arrangement will appear as seen in FIG. 8, providing a recess 64 to accept the locating stud or bolt 38 commonly used with metal leaf springs and the associated mounting assembly such as the mounting assembly 18. The resultant spring assembly 60 also has a uniform width throughout its length with its maximum thickness at a midpoint and the minimum thickness at its ends.

Figure 10:
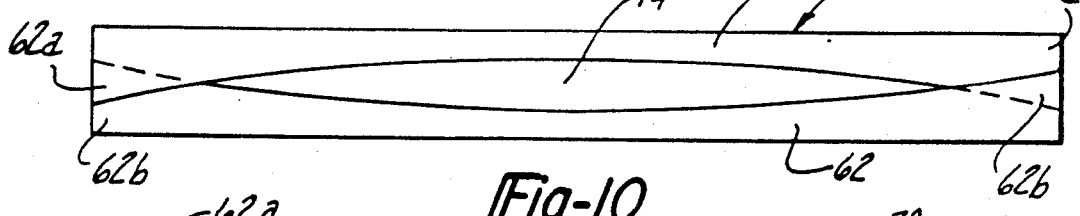
FIGS. 10 and 11 are the top and side elevations of still another embodiment of the invention.
Figure 11:
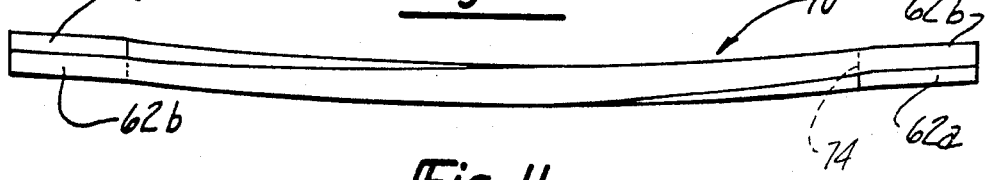

A further modification of the invention is illustrated in FIGS. 10 and 11. In this arrangement, the pair of body portions 62a and 62b can be identical with the body portions 62 described in connection with the embodiment in FIGS. 8 and 9. However, the resultant spring assembly 70 has the body portions 62a and 62b arranged so that the end portion of one body portion 62a at the left end of the arrangement, as seen in FIGS. 10 and 11, is under the end of the adjacent body portion 62b. However, at the right end of the spring assembly 70, the one body portion 62a is above the other body portion 62b. The pair of body portions 62a and 62b form an elongated recess 74 similar to recesses 26 and 64.

In all of the disclosed embodiments of the invention, the overall width of the spring assemblies 10, 50, 60 and 70 are substantially uniform throughout the entire length of the spring. Also, in each instance, the spring has its maximum thickness at a midportion and tapers to thinner sections at its opposite ends to approach a theoretical, substantially uniform cross-sectional area throughout the length of the spring. This results in the formation of the recesses 26, 64 and 74 intermediate the ends and sides of the springs.

In all of the embodiments of the invention, the side elevations seen in FIGS. 2, 4, 7, 9 and 11 are illustrated as they might appear under load. In other words, the springs will have a substantially greater curvature in the relaxed, as molded position.

The configuration of the body portions 22, whether made separately or jointly as a unit in pairs, lends itself to formation by a continuous manufacturing process. In arrangements in which filaments of glass are formed in a matrix of polymerized resins, it is desirable to use heat in the curing process and further to distribute the heat rapidly. In the present arrangements, the center recesses 26, 64 and 74 formed between the body portions offer additional surfaces to which heat can be applied for curing. Moreover, the theoretical uniform area cross section in each of the body portions 22, 52, 62, makes it possible to provide for a substantial uniform distribution of the continuous glass filaments throughout the full length of the spring assemblies 10, 50, 60 or 70.

One method by which such body portions, either separately or in unitized pairs, can be manufactured continuously is illustrated in FIG. 12. In such a process, continuous fiberglass filaments 78 are fed from a multiple number of stations 80 to a resin tank 82 where they are coated with resin. As the resin-coated filaments 78 leave the tank 82, they are brought more closely together and excess resin is squeezed from the filaments at a block 84. The multiple filaments are pulled through a preheater 86 by a rotary molding machine 86 having matching mold portions 90 and 92 which determine the configuration of the various body portions 22, 52 or 62 or the body member 28. The inner mold 90 travels in a rotary path defined by a rotary table 94. The outer mold 92 travels with a flexible metal belt 96 having a path to one side of the rotary table 94. Both of the inner and outer molds 90, 92 are heated to accelerate the curing process of the resin. After the mold 90 progresses through approximately 180 degrees of rotation of the table 94, the body portions 22, 52, 62 or the body member 28 will be substantially cured and is separated from the next adjacent body portion or body member at a station 98 where the adjacent portions are sawed apart. Thereafter, the finished body portion or member can be removed at a station 100 for further operations.

A lightweight spring has been provided in which the main body portion is formed of filaments in a matrix of polymerized resin such as flass filaments in epoxy or other resin. The spring body has a theoretical constant area cross section throughout its length and has a uniform width but varies in thickness from a maximum at its midpoint to its opposite ends. Such a configuration results in the formation of an elongated recess intermediate opposite ends and sides of the spring body which serves to reduce the weight of the spring as well as offering additional surface area which can be subjected to heat during the curing process. The elongated recess also accommodates standard mounting hardware without requiring the formation of additional openings.

The embodiments of the invention in which an exclusive property or privilege is claimed are defined as follows:

1. A leaf spring having a pair of identical elongated body members constructed of continuous strands in a matrix of polymerized plastic resin, each said body member varying in thickness and width in opposite directions from a midportion substantially midway of its length, each said body member having its greatest thickness and its minimum width at said midportion and diminishing in thickness and increasing in width toward opposite ends, each said body member having at least one straight side edge and a constant cross-sectional area throughout the remaining portion of said body member, said pair of identical body members being arranged with the straight side edge of each body member facing in opposite directions and disposed parallel to each other to form a spring having a uniform width throughout its length.

2. The leaf spring of claim 1 wherein said pair of body members are arranged in side-by-side relationship to form a recess therebetween and intermediate said opposite ends of said body members to receive a mounting structure, said recess being formed without interrupting any of said continuous strands.

3. The leaf spring of claim 2 wherein said mounting structure includes a bolt member passing through said recess.

4. The leaf spring of claim 1 wherein said body members are joined together integrally as a unit with each other to form an opening midway of said width and substantially midway of the length of said spring assembly.

5. The leaf spring of claim 4 and further comprising a metallic leaf spring element having a substantially uniform cross section throughout its length disposed in abutting relationship with the top surface of said body members.

6. The leaf spring of claim 1 wherein a pair of body members are separate from each other and are disposed in layers substantially parallel to each other.

7. The leaf spring of claim 1 wherein multiple body members form a spring assembly and wherein said body members are disposed in layers substantially parallel to each other.

8. The leaf spring of claim 1 wherein multiple body members form said leaf spring and wherein one end of one body member is disposed below the corresponding end of an adjacent body member and the other end of said one body member is disposed above the corresponding end of said adjacent body member.

9. A leaf spring assembly including a pair of identical body members of continuous fiber strands in a matrix of polymerized plastic, each of said body members varying in thickness and width from a midportion substantially midway of the length of the body member, each of said body members having its maximum thickness and minimum width at said midportion and diminishing in thickness and increasing in width towards opposite ends, each of said body members having at least one straight side edge and a cross-sectional area at said midportion no less than the cross-sectional area throughout the remaining portions of each of said body members, said body members being disposed with said straight side edges disposed parallel to each other and at opposite sides of said spring assembly to provide a substantially uniform width throughout its length.

10. The leaf spring assembly of claim 9 wherein an elongated recess is formed substantially midway of the ends of said body members and said side edges without interupting any of said strands.

11. The leaf spring assembly of claim 10 and further comprising a mounting structure including a locating pin and wherein said pin is disposed in said recess.

* * * * *